Figures 1, 2:
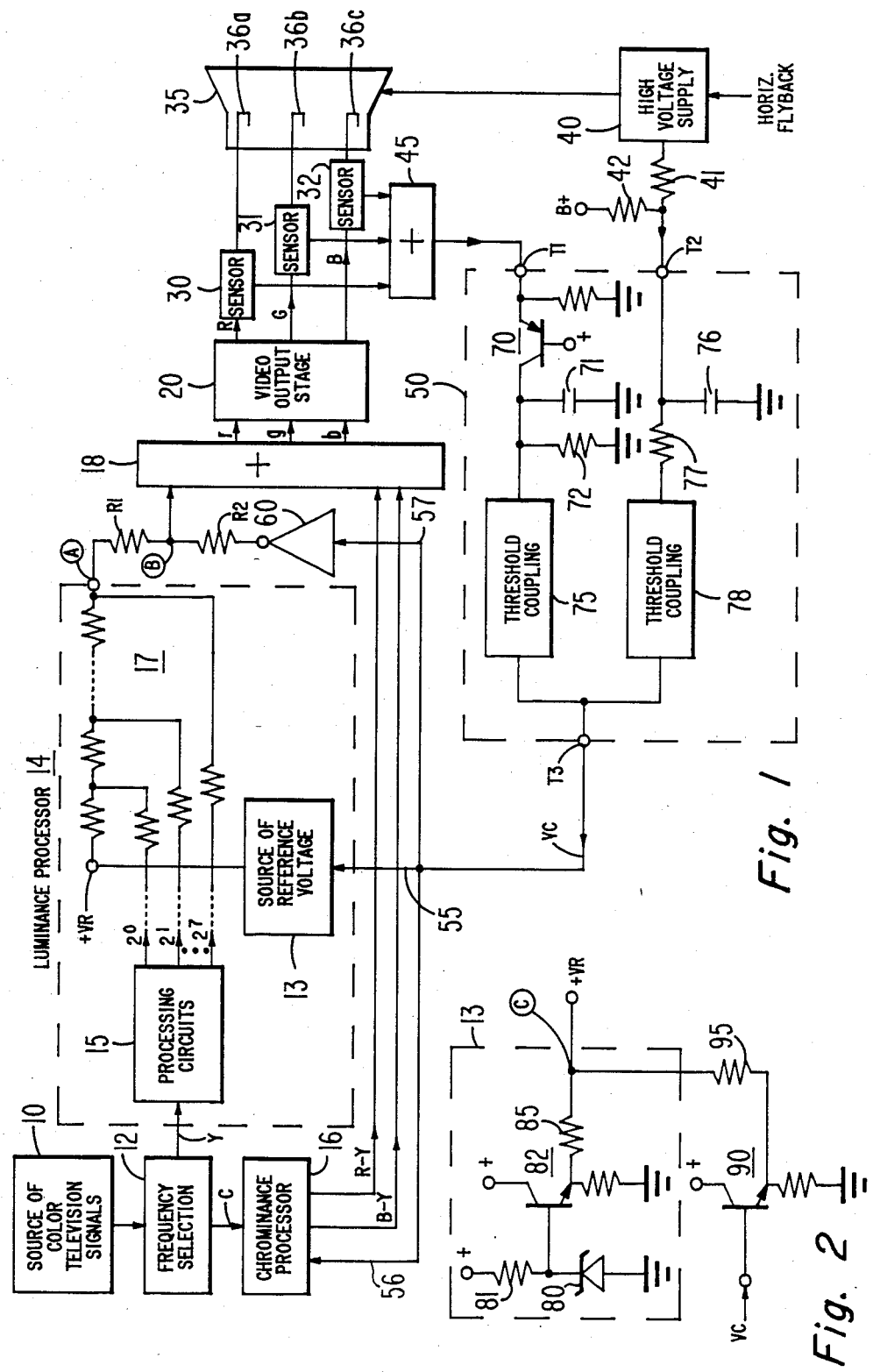

United States Patent [19]
Willis

[11] Patent Number: 4,633,320
[45] Date of Patent: Dec. 30, 1986

[54] VIDEO SIGNAL PROCESSOR WITH AUTOMATIC KINESCOPE BEAM CURRENT LIMITER

[75] Inventor: Donald H. Willis, Indianapolis, Ind.

[73] Assignee: RCA Corporation, Princeton, N.J.

[21] Appl. No.: 587,583

[22] Filed: Mar. 8, 1984

[51] Int. Cl.$^4$ .................. H04N 5/68; H04N 9/16
[52] U.S. Cl. ........................ 358/243; 358/74
[58] Field of Search ............... 358/243, 74, 39, 168

[56] References Cited

U.S. PATENT DOCUMENTS 4,207,591  6/1980  Parker ..................... 358/243 X
4,209,808  6/1980  Harwood ................. 358/243

FOREIGN PATENT DOCUMENTS 83865   7/1983  European Pat. Off. .
2014410   8/1979  United Kingdom .
2014409   8/1979  United Kingdom .
2046055  11/1980  United Kingdom .

OTHER PUBLICATIONS

Selected pages from a technical bulletin of the Semiconductor Division of ITT Corporation, titled "DIGIT 2000 VLSI Digital TV System".

*Primary Examiner*—James J. Groody
*Assistant Examiner*—E. Anne Toth
*Attorney, Agent, or Firm*—P. J. Rasmussen; P. M. Emanuel; R. H. Kurdyla

[57] ABSTRACT

In a digital video signal processing system including an image reproducing kinescope and a digital-to-analog converter (DAC), excessive kinescope beam current are automatically limited in response to a control signal which varies a reference voltage for the DAC such that the peak-to-peak amplitude of analog video signals from the DAC is reduced. A version of the control signal is applied to the output of the DAC with a magnitude and polarity for substantially negating unwanted shifts of the video signal black level during the beam current limiting mode.

7 Claims, 2 Drawing Figures

VIDEO SIGNAL PROCESSOR WITH AUTOMATIC KINESCOPE BEAM CURRENT LIMITER

This invention concerns a video signal processing system, such as a television receiver or video monitor, which includes apparatus for automatically limiting excessive beam currents conducted by an image reproducing device such as a kinescope associated with the system. In particular, this invention concerns such a system wherein compensation is provided for unwanted shifts of the video signal black level due to the action of the beam current limiter.

Many television receivers include apparatus for automatically limiting excessive kinescope beam currents conducted in response to video signal image information. Excessive beam currents can degrade a reproduced image by disrupting the operation of deflection circuits of the receiver and causing electron beam spot defocussing and picture blooming. Excessive beam currents can also exceed the safe operating current capability of the kinescope, possibly damaging the kinescope and associated circuit components.

Automatic beam current limiter systems are useful in both analog and digital video signal processing systems. A digital television signal processing system recently introduced by the Worldwide Semiconductor Group (Freiburg, West Germany) of International Telephone and Telegraph Corporation is described in an ITT Corporation publication titled "VLSI Digital TV System—DIGIT 2000." In that system, automatic kinescope beam current limiting over one range of excessive beam currents is accomplished in one respect by controlling the magnitude of luminance signals provided from a digital-to-analog converter (DAC) associated with the output of the luminance signal channel. Specifically, excessive beam currents are limited by reducing the level of a reference voltage associated with the DAC, thereby proportionally reducing the magnitude of the analog luminance signal from the output of the DAC.

The latter beam current limiting technique can produce an unwanted shift in the brightness representative black level of the luminance signal, such as when a non-zero digital number is associated with the luminance signal black level. It is usually considered preferable to limit beam current by means of controlling the peak-to-peak amplitude of a video signal because this manner of control produces a less noticeable and less disturbing effect on a reproduced image as seen by a viewer. Beam current control which causes a brightness representative black level shift is more noticeable by a viewer and is thus undesirable except in those situations which require beam current control by means of black level (brightness) control.

Apparatus in accordance with the present invention is included in a video signal processing system wherein a video channel, when controlled to reduced the amplitude of video signals to limit excessive beam currents, is otherwise undesirably subject to exhibiting an associated black level shift. In accordance with the principles of the invention, the disclosed apparatus compensates for black level shifts induced by beam limiter control action. Specifically, the disclosed apparatus is advantageously used in a digital video signal processing channel having an output DAC, wherein beam current limiting is accomplished by varying the magnitude of the DAC reference voltage in response to the beam limiter control signal, to thereby vary the magnitude of output analog video signals. Compensation for unwanted shifts in the black level of output video signals is accomplished by coupling to the output of the DAC a version of the control signal with a magnitude and polarity for substantially negating black level shifts.

In the drawing:

FIG. 1 shows a portion of a television receiver including an automatic kinescope beam current limiter and apparatus in accordance with the present invention; and FIG. 2 shows additional details of the arrangement of FIG. 1.

In FIG. 1, color television signals from a source 10 are supplied in digital (ie., binary) form to a frequency selection network 12 (eg., comprising a comb filter) for providing a separated luminance (Y) component of the television signal to a digital luminance signal processor 14 in a luminance channel of the receiver, and a separated chrominance (C) component to a digital chrominance processor 16 in a chrominance channel of the receiver. Luminance processor 14 includes digital signal processing circuits 15 which provide an 8-bit ($2^0 \ldots 2^7$) digital output signal to an input of an 8-bit digital-to-analog converter (DAC) 17. DAC 17 comprises an output circuit of processor 14 and includes a resistor ladder network for developing an output analog luminance signal in response to the 8-bit input digital luminance signal. A reference voltage $+V_R$ for DAC 17 is provided from a source of reference voltage 13.

Chrominance processor 16 includes output DAC networks for providing output analog R-Y and B-Y color difference signals in response to input digital chrominance signals. The analog color difference signals from processor 16 are combined in a matrix 18 with the output analog luminance signal from processor 14 to produce low level color image representative signals r, g and b. These signals are amplified by a video output stage 20 which comprises plural kinescope driver amplifiers for respectively providing high level R, G, B color signals suitable for driving intensity control cathode electrodes 36a, 36b and 36c of a color kinescope 35. The R, G, B signals are respectively coupled to the kinescope cathodes via current sensing networks 30, 31 and 32. A high operating voltage for the anode electrode of kinescope 35 is provided by a high voltage supply 40 (eg., comprising a voltage multiplier) responsive to horizontal flyback pulses derived from deflection circuits (not shown) of the receiver. Kinescope beam resupply currents are supplied to high voltage network 40 via a resistor 41 and a resistor 42 associated with a DC operating potential B+.

The receiver also includes an automatic kinescope beam current limiting system for limiting the magnitude of video signals applied to kinescope 35 to thereby limit excessive kinescope beam currents when the kinescope is sensed as conducting excessive beam currents above a given threshold level. The magnitudes of video signal kinescope cathode currents conducted during image scanning (trace) intervals of the video signal are respectively sensed by networks 30, 31 and 32. The sensed currents are added in a combining network 45 to produce a combined sensed current related to the total kinescope current. The combined current is applied to a first input terminal T1 of a beam current control circuit 50. An additional current, also related to the magnitude of currents conducted by kinescope 35, is derived from the resupply current network B+, 41, 42 for high voltage supply 40. This current is applied to a second input terminal T2 of control circuit 50. As will be explained afterwards, control circuit 50 develops an output control signal VC, at an output terminal T3, related to the magnitudes of both excessive peak (ie., transient) and average beam currents conducted by kinescope 35. Control signal VC appears at terminal T3 and is applied to luminance processor 14 and chrominance processor 16 via conductors 55 and 56, respectively, when kinescope currents exceed a given threshold value. Control signal VC is DC coupled to gain control inputs of the luminance and chrominance processors 14 and 16 with a magnitude and polarity for limiting the magnitudes of the output signals from luminance processor 14 and chrominance processor 16, to thereby limit the kinescope beam current to a prescribed safe level.

Beam current limiting is accomplished over a given range of excessive beam currents by simultaneously reducing the peak-to-peak amplitudes of the luminance and chrominance signals by means of a similar control technique. To reduce the amplitude of the luminance signal to produce beam current limiting, control signal VC is coupled to reference source 13 such that the magnitude of reference voltage VR for luminance DAC 17 is reduced as a function of the magnitude of control signal VC. Thus as the magnitude of the control signal is reduced, the peak-to-peak amplitude of the analog luminance signal at node A is also reduced for all luminance signal levels from black level through various gray levels to white level, since the amplitude of the output luminance signal is a function of the magnitude of reference voltage VR for luminance DAC 17. The controlled reduction of luminance signal amplitudes in a white-going direction accomplishes beam current limiting. However, in this instance a reduction in the black level of the output luminance signal is undesirable, and is substantially prevented from occuring by means of the circuit arrangement including conductor 57, inverter 60 and resistors R1 and R2. Resistor R1 couples the analog luminance signal from the output of luminance processor 14 at node A, to a node B at the luminance input of matrix 18. Inverter 60 and resistor R2 couple a version of beam limiter control signal VC to node B, as will soon be discussed.

In this system DAC 17 corresponds to an 8-bit network for converting the 8-bit, parallel input, binary form digital signal from luminance processing circuits 15 into a corresponding analog signal. The analog output signal is proportional to the product of the magnitude of the reference voltage (VR) for DAC 17, and the number represented by the digital input signal of DAC 17. The 8-bit digital luminance signal has 256 digital values corresponding to numbers from "0" to "255." The black level of the analog luminance signal corresponds to the non-zero digital value corresponding to "31" in this instance. Digital values below "31" represent blacker-than-black luminance information, and digital values above "31" represent shades of gray through white luminance information.

An undesired shift in the luminance signal black level, due to beam current limiter action, occurs because the digital value corresponding to the black level of the luminance signal produces a different, ie., non-black level, when reference voltage VR is changed in response to beam current control signal VC. The undesired black level shift is substantially prevented by means of the network including inverter 60 and resistors R1 and R2. The values of resistors R1 and R2 are chosen to establish a mutual resistance ratio R2/R1 according to the expression $$R2/R1 = [(2^N - 1) - M]/M$$

where "N" designates the number of binary bits associated with the digital luminance signal (N=8 in this case), and where "M" designates the digital number associated with the black level of the digital luminance signal (M=31 in this case). Thus in this example the resistance ratio required for substantially cancelling beam limiter induced black level variations is R2/R1=7.225, or approximately 7.

In operation, negative-going beam limiter control signal VC causes a related reduction in the magnitude of reference voltage VR for DAC 17, as will be seen from the circuit shown in FIG. 2. This results in a reduction of the peak-to-peak amplitude of the analog luminance signal at node A, including an undesired shift of the luminance signal black level in a less positive direction. Negative-going control signal VC is inverted by inverter 60 and appears with a more positive sense at the output of inverter 60. The inverted control signal and the analog luminance signal are combined at node B via voltage divider resistors R1, R2. With the mutual values of resistors R1 and R2 being chosen as described above, unwanted beam limiter induced luminance signal black level variations in a blacker-than-black direction are substantially negated at node B.

Referring to beam limiter control circuit 50, the combined current coupled to input terminal T1 is sensed by a PNP transistor 70 with a collector output electrode coupled to a peak responding RC time constant network including a capacitor 71 and a resistor 72. The voltage developed across capacitor 71 is related to the magnitude of peak cathode currents conducted by kinescope 35. This voltage represents one component of control signal VC, and is coupled to output terminal T3 in inverted form via a threshold coupling and signal inverting network 75 (eg., including an electronic switch) when the magnitude of the voltage across capacitor 71 exceeds a given threshold level. The current coupled to input terminal T2 from the kinescope resupply current network is integrated by means of a capacitor 76 to develop a voltage related to the magnitude of the average current conduction of kinescope 35. This voltage represents another component of control signal VC, and is coupled to output terminal T3 via a resistor 77 and a threshold coupling network 78 when the magnitude of the voltage across capacitor 71 exceeds a given threshold level.

Luminance processor 14, chrominance processor 16 and current sensors 30-32 can be of the type utilized by the ITT digital television signal processing system mentioned previously. Each of current sensors 30-32 may comprise a high voltage PNP emitter follower transistor included in the kinescope cathode signal coupling path, with a base input electrode coupled to the output of the associated kinescope driver amplifier in stage 20, an emitter output electrode coupled to the associated kinescope cathode, and a collector electrode coupled to current summing network 45 as shown, for example, in my copending U.S. patent application Ser. No. 497,157 filed May 23, 1983, now U.S. Pat. No. 4,516,152, titled "Video Signal Processor With Automatic Kinescope White Balance and Beam Current Limiter Control Systems." Beam limiter control circuit 50 can also employ a peak (transient) and average responding beam current limiter circuit of the type shown in my U.S. Pat. No. 4,167,025.

FIG. 2 shows details of a circuit suitable for varying reference voltage VR in response to beam limiter control signal VC. In FIG. 2, reference voltage source 13 (FIG. 1) comprises a zener reference diode 80 and an associated biasing resistor 81 coupled to a supply voltage (+). Reference voltage +VR for DAC 17 in FIG. 1 is derived from zener diode 80 by means of a coupling network including an emitter follower transistor 82 and a resistor 85. The magnitude of reference voltage VR is varied by beam limiter control voltage VC, which is coupled to output node C via an emitter follower transistor 90 and a resistor 95.

What is claimed is:

1. A video signal processing system comprising:
   a source of digital video signals with information bearing bits defining plural video signal information levels including black image representative level;
   image display means responsive to video signals from said source;
   control means for developing a control signal representative of the magnitude of excessive currents conducted by said display means greater than a threshold level;
   means for coupling said control signal to said video signal source for controlling the magnitude of said video signals to limit excessive currents conducted by said display means, said video signal black level being subject to varying undesirably in accordance with variations of said controlled video signal;
   means for producing a compensation signal with a magnitude related to the magnitude of said control signal; and
   means for DC coupling said compensation signal to said video signal source for substantially negating said variations of said video signal black level.

2. A system according to claim 1, wherein
   said control signal is representative of excessive peak and average currents conducted by said display means.

3. A video signal processing system comprising
   a source of digital video signals with information bearing bits defining plural video signal information levels including a black image representative level;
   image display means responsive to video signals from said source;
   control means for developing a control signal representative of the magnitude of excessive currents conducted by said display means greater than a threshold level;
   means for coupling said control signal to said video signal source for controlling the magnitude of said video signals to limit excessive currents conducted by said display means, said video signal black level being subject to varying undesirably in accordance with variations of said controlled video signal; and
   means DC coupled to said control means and to said video signal source for substantially negating said variations of said video signal black level; wherein
   a version of said control signal is DC coupled to said video signal source for inhibiting said video signal black level variations;
   said video signal source comprises digital-to-analog signal converter means responsive to digital video signals and having an associated reference voltage, for providing an output analog signal having a magnitude related to the value of said digital video signals and to the magnitude of said reference voltage; and
   said control signal is coupled to said converter means for varying the magnitude of said reference voltage to thereby control the magnitude of output analog video signals from said control means to effect limiting of said excessive currents.

4. A system according to claim 3, wherein
   said analog output video signal from said converter means is combined in a signal combining network with said version of said control signal to inhibit variations of said video signal black level.

5. A system according to claim 4, wherein
   said digital video signal contains N information bearing bits defining plural video signal information levels including a black image representative level M;
   said analog video signal is coupled to said combining network via a first current path exhibiting a first impedance R1; and
   said version of said control signal is coupled to said combining network via a second current path exhibiting a second impedance R2; wherein
   the ratio of said second impedance to said first impedance is given by the expression $R2/R1 = [(2^N - 1) - M]/M$.

6. A video signal processing system comprising:
   a source of digital video signals with information bearing bits defining plural video signal information levels including a black image representative level; said video signal source comprising digital-to-analog signal converter means responsive to digital video signals and having an associated reference voltage, for providing an output analog signal having a magnitude related to the value of said digital video signals and to the magnitude of said reference voltage;
   image display means responsive to video signals from said source;
   control means for developing a control signal representative of the magnitude of excessive currents conducted by said display means greater than a threshold level;
   means for coupling said control signal to said converter means for varying the magnitude of said reference voltage for thereby controlling the magnitude of output analog video signals from said converter means to limit excessive currents conducted by said display means, said video signal black level being subject to varying undesirably in accordance with variations of said controlled video signal; and wherein
   a version of said control signal is coupled to said signal converter means for inhibiting said video signal black level variations.

7. A system according to claim 6, wherein
   said version of said control signal is DC coupled to said analog output of said converter means.

* * * * *